United States Patent [19]
Seppänen

[11] Patent Number: 5,699,831
[45] Date of Patent: Dec. 23, 1997

[54] CONNECTING DEVICE IN A PAINT TONING MACHINE

[75] Inventor: Tapio Seppänen, Kaasmarkku, Finland

[73] Assignee: Cimcorp Oy, Kaasmarkku, Finland

[21] Appl. No.: 522,329

[22] PCT Filed: Mar. 18, 1994

[86] PCT No.: PCT/FI94/00101

§ 371 Date: Sep. 14, 1995

§ 102(e) Date: Sep. 14, 1995

[87] PCT Pub. No.: WO94/21477

PCT Pub. Date: Sep. 29, 1994

[30] Foreign Application Priority Data

Mar. 23, 1993 [FI] Finland ..................................... 931282

[51] Int. Cl.6 ................................................. F16L 37/28
[52] U.S. Cl. ................................................. 137/614.03
[58] Field of Search .......................... 137/614.03, 614.04, 137/614

[56] References Cited

U.S. PATENT DOCUMENTS 3,871,404  3/1975  Courant ........................... 137/614.03
4,890,642  1/1990  Smazik et al. ..................... 137/614.03

FOREIGN PATENT DOCUMENTS 0 470 694 A1  2/1992  European Pat. Off. .

*Primary Examiner*—Kevin Lee
*Attorney, Agent, or Firm*—Fitch, Even, Tabin & Flannery

[57] ABSTRACT

The invention relates to a connecting device in a paint toning machine for connecting a paste container to a toning paste supply hose of the toning machine. In order to maintain the tightness of the internal system of both the paste container and the paint toning machine when the paste container is being connected or disconnected, the connecting device comprises a first connector to be connected to the discharge aperture of the paste container and including a valve element, a second connector to be connected to the toning paste supply hose and including a spindle, and a connecting mount for receiving the first and the second connector, for supporting them against each other and for forcing the spindle of the second connector to open the valve element of the first connector.

9 Claims, 4 Drawing Sheets

CONNECTING DEVICE IN A PAINT TONING MACHINE

BACKGROUND OF THE INVENTION

The present invention relates to a connecting device in a paint toning machine for connecting a paste container to a toning paste supply hose of the toning machine.

The connecting device according to the invention is particularly well suited for use in a paint toning machine as described in U.S. Pat. No. 5,174,474. This paint toning machine comprises a bag-like paste container connected through hoses and a valve element to another toning paste container in the machine. Due to this arrangement the bag-like paste container can be a replaceable refill container. In the paint toning machine according to U.S. Pat. No. 5,174,474, the connecting device between the replaceable paste container and the paste container that is a fixed part of the machine is relatively complicated and difficult to use.

SUMMARY OF THE INVENTION

The object of the present invention is to provide a connecting device by which a toning paste container can be easily and quickly connected to a toning paste supply hose, but it can also be quickly disconnected when required without the danger of toning paste leaking from the container to the environment or air being allowed to enter the container or the supply hose.

The above object can be achieved by means of a connecting device according to the invention, which is characterized in that it comprises a first connector to be connected to a discharge aperture of the paste container and containing a valve element, a second connector to be connected to the toning paste supply hose and containing a spindle, and a connection mount for receiving the first and the second connector, for supporting them against each other and for forcing the spindle of the second connector to open the valve element of the first connector.

When the paste container is of a type in which the discharge aperture comprises a sealing film to be cut when the container is opened and a collar surrounding it, said collar provides a first connector for the connecting device. In this case the connecting device according to the invention is characterized in that it further comprises a second connector to be connected to the toning paste supply hose and including an opening spindle for cutting said sealing film, and a connection mount for receiving the first and the second connector, for supporting them against each other and for forcing the spindle of the second connector to cut the sealing film of the first connector.

Preferably the second connector comprises a bellows-type compressible body for making the opening spindle push forward. The valve element in the first connector is opened or the sealing film cut in such a way that the body of the second connector is compressed by means of the connection mount, thereby making the opening spindle therein push forward and forcing the valve element in the first connector to move to a position which opens the flow connection or to cut the sealing film.

Preferably the body of the second connector is spring-loaded to maintain the body in the maximum length allowed by the opening spindle. Thereby it is further preferred that the opening spindle comprises a sealing surface, which presses against the countersurface in the body of the second connector while said body is in the non-compressed position, and thereby closes the flow connection through the second connector.

DESCRIPTION OF THE DRAWINGS

In the following an embodiment of the connecting device according to the present invention will be described in more detail with reference to the accompanying drawing, in which.

DESCRIPTION

Figure 1:
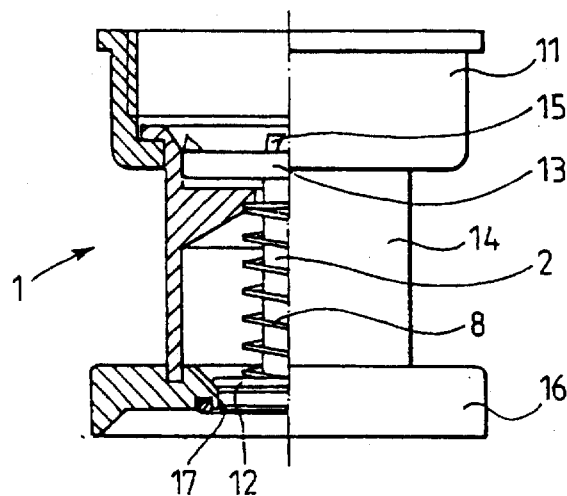
FIG. 1 shows a first connector of the connecting device according to the invention in partial cross-section.

FIG. 1 shows a first connector of the connecting device according to the invention, which is intended to be connected to the discharge aperture 52 of the paste container 50. Typically the paste container to be used with the connecting device according to the invention is a disposable, bag-like and thus compressible paste container. It is closed with a cap and possibly also with a film under the cap. When the cap has been removed, the first connector according to FIG. 1 is screwed with its cap-like part 11 in place of the cap of the paste container. In addition to said cap-like part 11, the first connector comprises a valve element 2, which is loaded by means of a spring 8 in a position in which it closes the flow channel running through the connector 1. Plate-like parts 13 and 12 on both ends of the spindle thereby function as the actual closing elements, which have countersurfaces on the body 14 around the valve element 2 and on a flange 16 attached to the bottom of the body 14. As the valve element 2 is moved inside the body 14 against the force of the spring 8, a discharge channel is opened for the toning paste through the connector 1. Cutting edges 15 have also been formed on the top surface of the valve plate 13 on the head of the valve element 2 for cutting the possible sealing film on the paste container. If there is such a sealing film on the paste container, the connection to the paste container is not opened until the valve element 2 is moved to the "open" position.

The end of the first connector 1 which is opposite the cap-like part 11 is provided with a flange 16, on the lower surface of which a sealing ring 17 has been fitted in a ring-shaped groove near the valve plate 12. The sealing ring will seal the joint between the first and the second connector, as will be described later.

Figure 2:
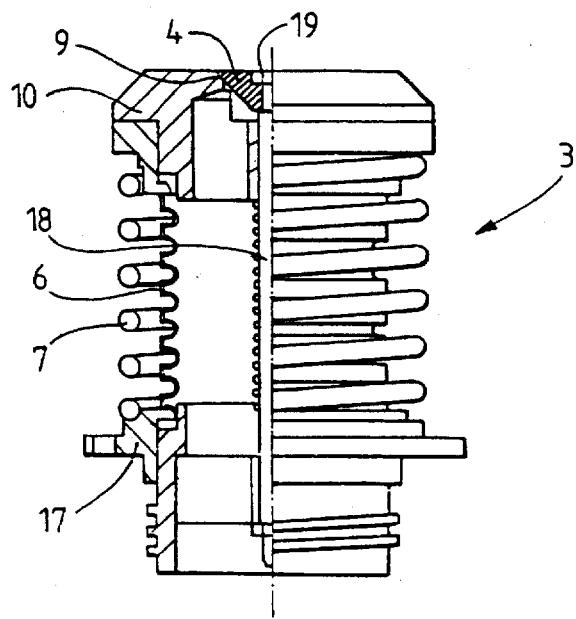
FIG. 2 shows a second connector of the connecting device according to the invention also in partial cross-section.

FIG. 2 shows a second connector of the connecting device according to the invention in partial cross-section. This connector 3 comprises in its central portion a bellows-type compressible body 6 with flange-like extensions 10 and 17 at the ends thereof. A coil spring 7 has been fitted around the bellows-type body 6, said spring being pressed between the flange-like parts 10 and 17 and stretching the bellows 6 to the length allowed by a shaft 18 of the opening spindle 4, which shaft runs axially in the centre of the bellows. The flange-like part 10 is intended to lie against the flange-like part 16 of the first connector, and the flange-like part 17 is intended to be attached by means of threading to the paste supply hose of the paint toning machine. The end of the shaft 18 is expanded to form the opening spindle 4, which in the non-compressed position of the connector 3 supports its countersurface 9 against the countersurface provided in the flange-like part 10, thereby closing the flow channel that runs through the connector 3. A hex nut 19 has been fitted centrally in the opening spindle 4 at the end of the shaft 18, for fastening the opening spindle 4 to the shaft 18 and for assembling the body 6 and the flange-like parts 10 and 17 to form the second connector 3.

Figure 3:
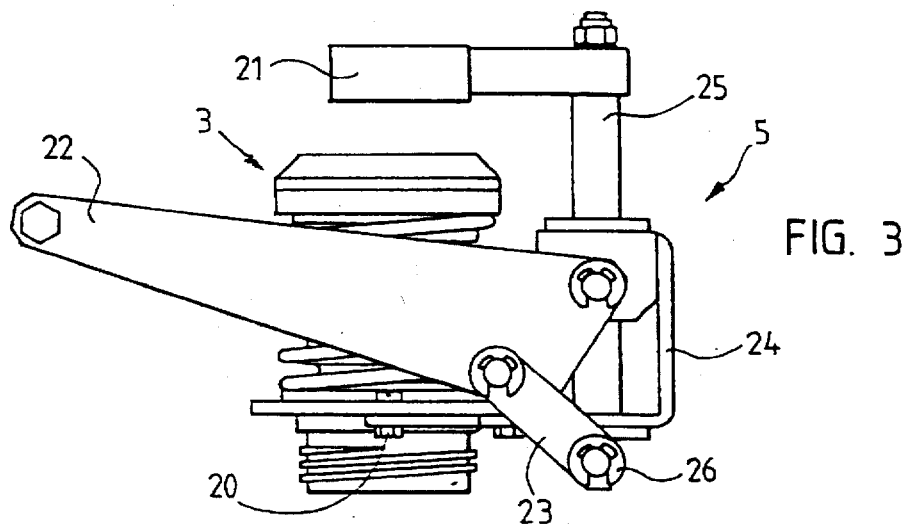
FIG. 3 shows a connection mount of the connecting device according to the invention, having the second connector according to FIG. 2 fitted thereon.

FIG. 3 shows a connection mount of the connecting device according to the invention, to which the first and the second connector are fitted when it is desired that the paste container is connected to the toning paste supply hose in the toning machine. This connection mount is supported on the body of the paint toning machine, and has a fixed position thereon. It comprises a rack part 20, on which the second connector 3 has been placed in FIG. 3. This second connector is supported on the rack part 20 at its flange 17. The connection mount 5 further comprises a fork-like part 21, the height of which in relation to the rack part 20 can be varied by means of levers 22 and 23 in the connection mount. The lever 22 is triangle-shaped and is jointed at one point to the body 24 of the connection mount 5 and at another point to the lever 23. The lever 23 is at its other end jointed to the lower end 26 of the vertical shaft 25 which is attached to the fork-like part 21. When the lever 22 is pushed down at its third point, it forces by means of the lever 23 the vertical shaft 25 to press down and thereby also the fork-like part 21 to come down towards the rack part 20.

Figure 4:
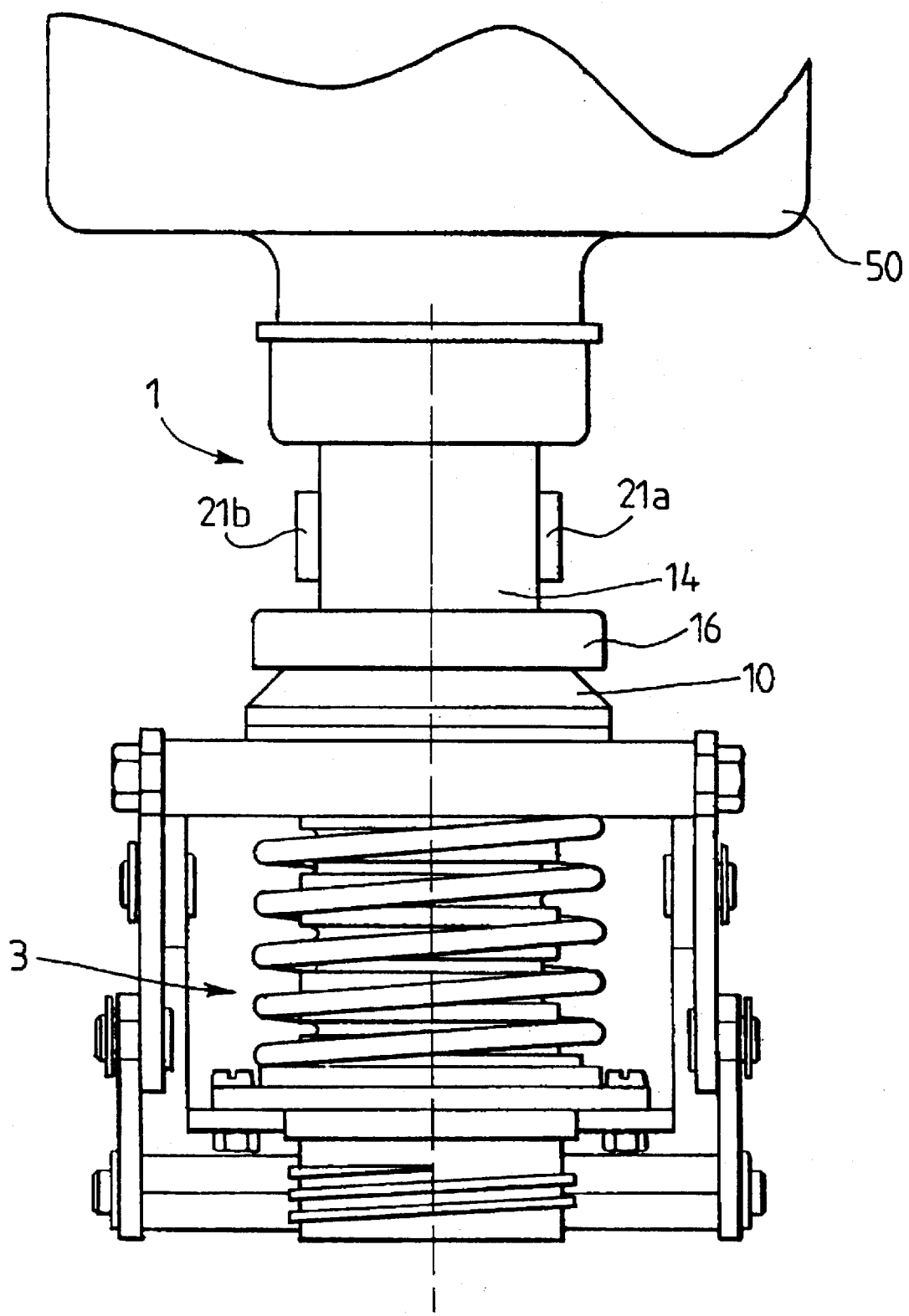
FIG. 4 is a front elevational view showing the connection mount with the first and second connectors therein and the first connector in position to be clamped down onto the second connector.
Figure 5:
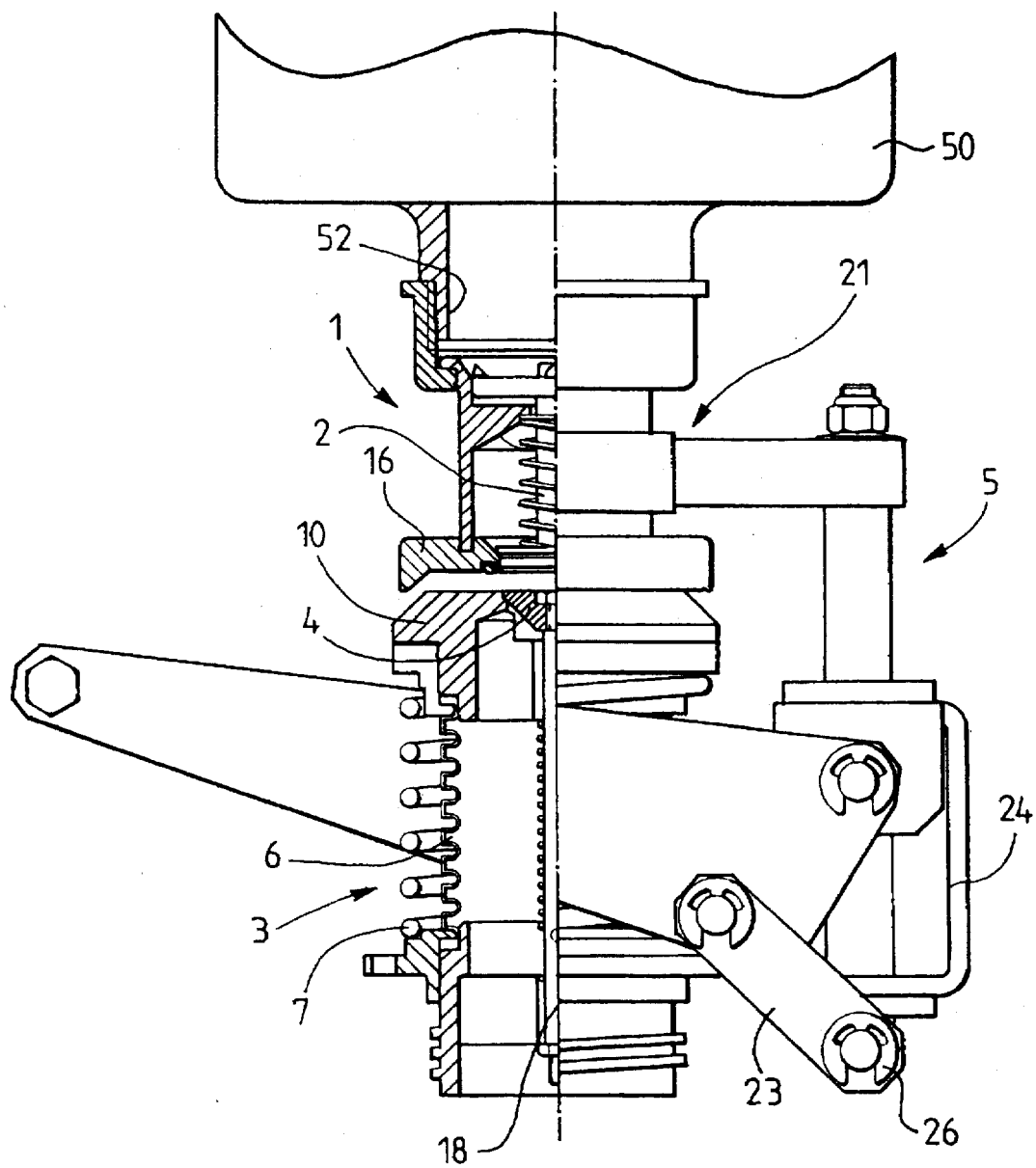
FIG. 5 is a side elevational view, partially in section, of the connection mount and first and second connectors of FIG. 4 showing the relative arrangement of the valve and spindle of the respective connectors.

When the connecting device is used, the first connector 1 is brought on top of the second connector 3 in such a way that the body 14 of the first connector lies between the forks 21a and 21b of the fork-like part 21, and the flange 16 of the lower part of the first connector remains below the fork-like part 21 (FIGS. 4 and 5). Thus it is possible to press the first connector 1 downwards in the direction of the second connector 3 by means of the fork-like part 21. When this is done, the conic surfaces of the flange-like part 16 and the part 10 centre the first and the second connector in relation to one another, and an O-ring 17 on the lower surface of the flange 16 seals the first and the second connector in relation to one another. Thereafter, as the downward movement of the fork-like part 21 continues, the bellows 6 is compressed against the force of the spring 7, the part 10 being detached from the spindle 4 and the valve plate 12 of the valve element 2 pressing against the spindle 4 and further up. As the spindle 4 is detached from the part 10, a connection is opened through the second valve element, and the spindle 4, as its height remains unchanged, opens the valve element 2 of the connector 1, whereby also a connection through the first connector is opened. Only after these connections are opened is the valve element 2 in such a position that it can cut the possible sealing film on the toning paste container.

If it is desired that the toning paste container is detached from the paint toning machine, the above mentioned steps are repeated in the opposite order, whereby the lever 22 is moved upwards, causing the first connector 1 to move upwards, closing the valve element 2 in the first connector 1, and the part 10 in the second connector 3 pressing against the countersurface of the opening spindle 4, whereby also the connection through the second connector 3 is closed.

This enables airtight sealing of the paint toning machine system and the toning paste container prior to the airtight connection between the first and the second connector achieved by means of the O-ring 17 is opened.

Figure 6:
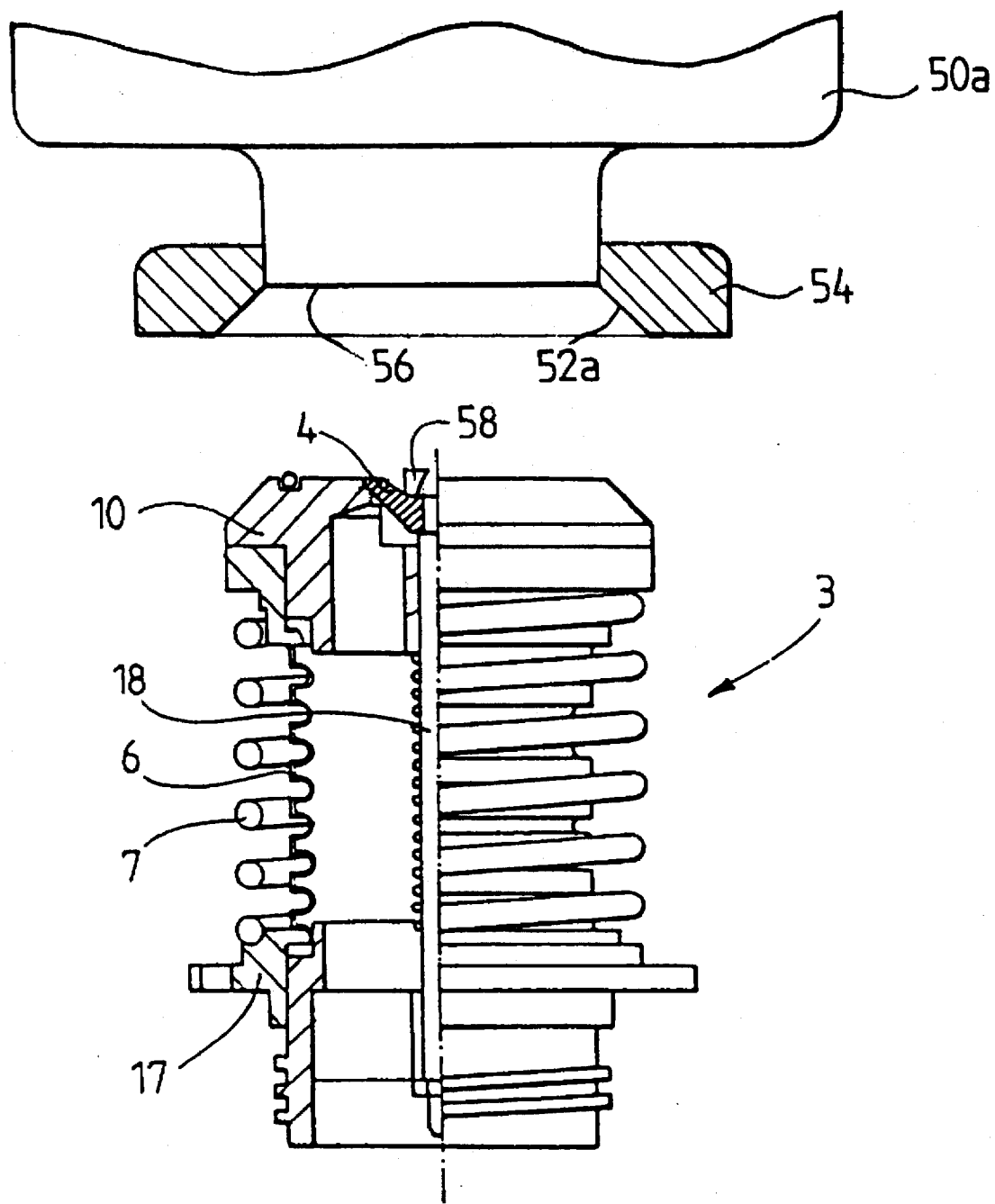
FIG. 6 is a side elevation partially sectioned view of another embodiment according to the invention showing a modified paste container and second connector which are adapted to be used in the connection mount with the second connector capable of cutting the sealing film of the container discharge aperture.

According to another embodiment of the invention, (FIG. 6) the first connector described above in FIG. 1 is replaced by forming a suitable collar 54 on the aperture 52a of the paste container 50a and by providing the aperture with a sealing film 56. Thereby the paste container 50a can be connected directly to the second connector shown in FIGS. 2 and 3 and to the connection mount without using a first connector as shown in FIG. 1. The second connector shown in FIG. 2 must then be somewhat modified, which means in practice that the opening spindle 4 must be equipped with suitable cutting edges 58 for cutting the closing film 56 of the paste container and the upper surface of the flange part 10 must be equipped with a sealing surface which seals it against the collar of the discharge aperture of the paste container. In addition, the collar of the discharge aperture must be of the kind that it can be gripped with a fork part 21 as shown in FIG. 3 to force the collar tightly against the second connector 3. One defect of this second embodiment compared with the first embodiment is that the paste container cannot be detached from the paint toning machine before the container is completely empty, if leaking of the paste to the environment is to be prevented. This is because the paste container is placed in the machine with its aperture downwards and is intended to be emptied gravitationally.

In the above the connecting device according to the invention is described by way of two exemplary embodiments only, and it is to be understood that a connecting device according to the invention could be realized in a different way than in the example described without departing from the scope defined by the attached claims.

I claim:

1. A connecting device in a paint toning machine for connecting a paste container to a toning paste supply hose of the toning machine, comprising a first connector to be connected to a discharge aperture of the paste container and containing a valve element, a second connector to be connected to the toning paste supply hose and containing a spindle, and a connection mount for receiving the first and the second connector, for supporting them against each other and for forcing the spindle of the second connector to open the valve element of the first connector.

2. A connecting device according to claim 1, wherein the second connector comprises a bellows-type compressible body for making the opening spindle push forward.

3. A connecting device according to claim 2, wherein the body of the second connector is spring-loaded to maintain the body in the maximum length allowed by the opening spindle.

4. A connecting device according to claim 3, wherein the second connector body includes a countersurface and the opening spindle comprises a sealing surface which presses against the countersurface in the body of the second connector while said body is in the non-compressed position and thereby closes the flow connection through the second connector.

5. A connecting device according to claim 1, wherein the valve element of the first connector in its closed position.

6. A connecting device in a paint toning machine for connecting a paste container to a toning paste supply hose of the toning machine, a discharge aperture of the paste container comprising a sealing film to be cut when the container is opened and a collar surrounding it, said collar providing a first connector for the connecting device, comprising a second connector to be connected to the toning paste supply hose and including an opening spindle for cutting said sealing film, and a connection mount for receiving the first and the second connector, for supporting them against each other and for forcing the spindle of the second connector to cut the sealing film of the discharge aperture of the paste container.

7. A connecting device according to claim 2, wherein the second connector comprises a bellows-type compressible body for making the opening spindle push forward.

8. A connecting device according to claim 7, wherein the body of the second connector is spring-loaded to maintain the body in the maximum length allowed by the opening spindle.

9. A connecting device according to claim 8, wherein the second connector body includes a countersurface and the opening spindle comprises a sealing surface which presses against the countersurface in the body of the second connector while said body is in the non-compressed position and thereby closes the flow connection through the second connector.

* * * * *

UNITED STATES PATENT AND TRADEMARK OFFICE
CERTIFICATE OF CORRECTION

PATENT NO. : 5,699,831
DATED : December 23, 1997
INVENTOR(S) : Tapio SEPPÄNEN

It is certified that error appears in the above-indentified patent and that said Letters Patent is hereby corrected as shown below:

At column 4, line 63, replace " connector in " with -- connector is spring-loaded in--.

At column 5, line 11, change "2" to --6--.

Signed and Sealed this

Sixteenth Day of June, 1998

Attest:

BRUCE LEHMAN

Attesting Officer　　　　　　　Commissioner of Patents and Trademarks